United States Patent
Akazawa et al.

(10) Patent No.: US 8,291,164 B2
(45) Date of Patent: Oct. 16, 2012

(54) ADAPTER APPARATUS COUPLED TO A MEMORY CARD AND DATA TRANSMISSION SYSTEM INCLUDING THE ADAPTER APPARATUS

(75) Inventors: Toru Akazawa, Tokyo (JP); Akira Sonoda, Chiba (JP); Nobutaka Toyoshima, Tokyo (JP); Tetsufumi Nozawa, Chiba (JP)

(73) Assignee: Sony Computer Entertainment Inc., Tokyo (JP)

( * ) Notice: Subject to any disclaimer, the term of this patent is extended or adjusted under 35 U.S.C. 154(b) by 565 days.

(21) Appl. No.: 11/858,251

(22) Filed: Sep. 20, 2007

(65) Prior Publication Data

US 2008/0071986 A1    Mar. 20, 2008

(30) Foreign Application Priority Data

Sep. 20, 2006  (JP) ................. 2006-255012

(51) Int. Cl.
 *G06F 12/00* (2006.01)
(52) U.S. Cl. ........ 711/115; 711/101; 711/103; 710/301; 710/302; 710/16
(58) Field of Classification Search .................. None
 See application file for complete search history.

(56) References Cited

U.S. PATENT DOCUMENTS

| | | | |
|---|---|---|---|
| 6,182,179 B1 * | 1/2001 | Foote et al. | 710/313 |
| 6,725,291 B2 * | 4/2004 | Lai et al. | 710/16 |
| 2002/0178307 A1 | 11/2002 | Pua et al. | |
| 2003/0095386 A1 | 5/2003 | Le et al. | |
| 2003/0167369 A1 | 9/2003 | Chen et al. | |
| 2005/0033917 A1 | 2/2005 | Takeuchi | |
| 2005/0071543 A1 * | 3/2005 | Ellis et al. | 711/106 |
| 2005/0156037 A1 * | 7/2005 | Wurzburg | 235/435 |

FOREIGN PATENT DOCUMENTS

| | | |
|---|---|---|
| JP | 59-186446 | 10/1984 |
| JP | 3-50653 | 3/1991 |
| JP | 11-317068 | 11/1999 |

OTHER PUBLICATIONS

Japanese Office Action dated Jun. 17, 2008, from the corresponding Japanese Application.
European Search Report dated Sep. 16, 2008, from the corresponding European Application.

* cited by examiner

*Primary Examiner* — Kevin Ellis
*Assistant Examiner* — Alan Otto
(74) *Attorney, Agent, or Firm* — Katten Muchin Rosenman LLP

(57) ABSTRACT

An adapter apparatus has a function of determining the type of a memory card, by communicating with the memory card at plural communication speeds and determining whether or not there is a response therefrom. A communication speed setting unit has a function of setting plural communication speeds for communication with the memory card, and a response determining unit determines whether or not there is a response to a type determination signal. A type determining unit determines the type of the memory card based on the communication speed set by the communication speed setting unit and whether or not there is a response to the type determination signal sent at the communication speed.

12 Claims, 7 Drawing Sheets

FIG.7A

Block Read COMMAND
{
Read_Start
Page_Read
Page_Read
Page_Read
Page_Read
Page_Read
Read_End
}

FIG.7B

| Block_Read | Read_Start<br>Page_Read<br>Page_Read<br>Page_Read<br>Page_Read<br>Page_Read<br>Read_End |
|---|---|

ADAPTER APPARATUS COUPLED TO A MEMORY CARD AND DATA TRANSMISSION SYSTEM INCLUDING THE ADAPTER APPARATUS

BACKGROUND OF THE INVENTION

1. Field of the Invention

The present invention relates to an adapter apparatus to which a memory medium such as a memory card is attachable. The present invention also relates to a data transmission system, whereby a host apparatus reads data from and/or writes data into the memory medium via the adapter apparatus.

2. Description of the Related Art

With the rapid advancements in the integration technology, it becomes common that hardware specifications of various types of information processing apparatus are drastically redesigned in a short time cycle. Particularly in the game industry, this tendency is pronounced and the advent of game console, which is provided with not only the execution capabilities of game application but also the capabilities of processing various kinds of application equivalent to those of common personal computers, is also expected. Such game console is expected to be used in a manner closely related to a user's daily life in various scenes.

There are many cases where a memory card that is an external storage device is used for storing data in an information processing apparatus such as a game console or personal computer. When a new type of the information processing apparatus is no longer equipped with a slot for a memory card, whereas the conventional type is equipped therewith, there is a demand for development of an adapter apparatus whereby the data in the memory card can be transferred to the new type of the information processing apparatus, so that the data saved in the conventional type can be utilized in the new type.

In a case where there are plural kinds of memory cards different in the protocol specification such as clock frequency, it is preferred that the information processing apparatus can read data from and/or write data into various memory cards. It is also preferred to perform the data transfer process efficiently in a short period of time.

SUMMARY OF THE INVENTION

The present invention has a general purpose of providing a technique of reading data from and/or writing data into a memory medium such as a memory card in an efficient manner.

In order to address the above issue, an adapter apparatus according to an aspect of the present invention, comprising: a first connector to be electrically coupled to a terminal of an external memory medium; a second connector to be electrically coupled to a host apparatus; and a processor which controls data transfer between the external memory medium and the host apparatus, wherein the processor communicates with the external memory medium at a plurality of communication speeds and detects whether or not there is a response from the external memory medium so as to determine, in a cycle, a type of the memory medium.

Another aspect of the present invention is an adapter apparatus comprising: a connector to be electrically coupled to a terminal of an external memory medium; a communication unit which communicates with a host apparatus; a processor which controls data transfer between the external memory medium and the host apparatus, wherein the processor communicates with the external memory medium at a plurality of communication speeds and detects whether or not there is a response from the external memory medium so as to determine, in a cycle, a type of the memory medium in a cycle.

Yet another aspect of the present invention is a data transfer system comprising a host apparatus which is operative to read data from and/or write data into an external memory medium attached to an adapter apparatus, wherein the host apparatus comprises a medium information requester which requests the adapter apparatus to send information on the external memory medium, when it is determined that an external terminal connected is the adapter apparatus; wherein the adapter apparatus comprises: a receiving unit which receives an information send request from the host apparatus; and a determination processor which communicates with the external memory medium at least one communication speed to detect whether or not there is a response from the external memory medium, and performs a determination process in a given cycle so as to determine a type of the external memory medium when there is the response, or to determine that no external memory medium is attached when there is no response to communication at a plurality of communication speeds; and wherein the determination processor sends a result of the determination process to the host apparatus, after the receiving unit receives the information send request.

Further another aspect of the present invention is a data transfer system comprising a host apparatus which is operative to read data from and/or write data into an external memory medium attached to an adapter apparatus, wherein the host apparatus comprises a read controller which gives a data read instruction to read data from the external memory medium; and wherein the adapter apparatus comprises: a receiving unit which receives the data read instruction from the host apparatus; a retaining unit which retains a plurality of commands associated with the data read instruction; and a command executing unit which sequentially sends a plurality of commands retained in the retaining unit to the external memory medium.

Optional combinations of the aforementioned constituting elements, and implementations of the intention in the form of methods, processors, apparatuses, systems, recording media, computer programs, data structures, etc. may also be practiced as additional modes of the present invention.

BRIEF DESCRIPTION OF THE DRAWINGS

FIG. 7A shows an example of Block_Read command set; and

FIG. 7B is a table showing the correspondence of commands retained in a retaining unit.

DETAILED DESCRIPTION OF THE INVENTION

The invention will now be described by reference to the preferred embodiments. This does not intend to limit the scope of the present invention, but to exemplify the invention.

Figure 1:
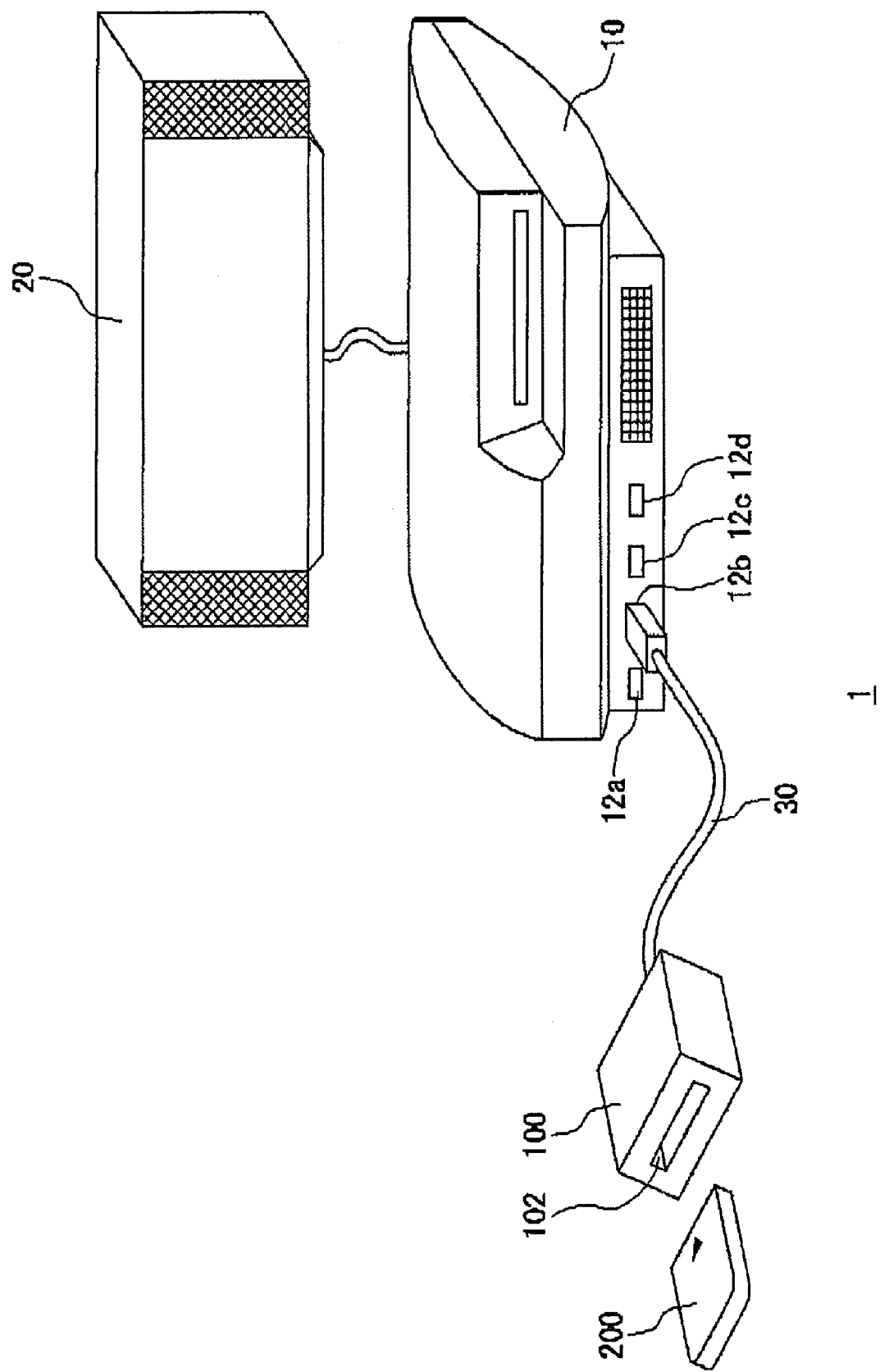
FIG. 1 shows a use environment of a game system according to an embodiment of the present invention.

FIG. 1 shows a use environment of a game system according to an embodiment of the present invention. A game system 1 is provided with: an adapter apparatus 100 to which a memory card 200 is attached; a game console 10 having a function of reading data from and/or writing data into the memory card 200 via the adapter apparatus 100; and an output apparatus 20 that outputs the processing result of the game console 10. The output apparatus 20 may be a television set equipped with: an image outputting unit that outputs an image; and a sound outputting unit that outputs sound.

The game console 10 is an information processing apparatus that processes a game application and generates an image signal and a sound signal representing the processing result of the game application. The technique discussed in the present embodiment is not limited to the game application; but may be performed by a system having a processing apparatus that executes another type of application. The game console 10 includes plural Universal Serial Bus (USB) ports 12a, 12b, 12c, and 12d (hereinafter, generically referred to as "USB port 12").

The adapter apparatus 100 is provided with: an insertion slot 102 at the front face; and the USB port at the back face. There is formed an opening that continuously extends toward the back face from the insertion slot 102, and there is formed a connector in the opening so as to be connected with a terminal of the memory card 200. When the memory card 200 is inserted into the opening from the insertion slot 102 with the terminal thereof being as an insertion end, the terminal of the memory card 200 is electrically coupled with the connector in the opening.

The adapter apparatus 100 and the game console 10 establish a connection, when terminals at both ends of a USB cable 30 are respectively inserted into the USB port at the back face of the adapter apparatus 100 and into the USB port 12 of the game console 10. The adapter apparatus 100 has a function of converting between the communication protocol of the memory card 200 and that of the USB, thereby allowing data to be read and/or written between the memory card 200 and the game console 10. In the game system 1, the game console 10 serves as a parent apparatus (host) and the adapter apparatus 100 serves as a child apparatus (node).

For instance, the game console 10 may be a new type in which the hardware specifications are redesigned and the memory card 200 may be an external memory medium that has been used with a former type of the game console, in the game system 1. Since saved data of a game is stored in the memory card 200, a user is able to restart the game application from the state where the data was saved by a former type of the game console, by causing the game console 10 to transfer the data in the memory card 200 to a large capacity storage such as a hard disk.

The game console 10 and the adapter apparatus 100 are connected by the USB cable 30 in the game system 1; however, the game console 10 and the adapter apparatus 100 may be connected by a cable supporting another bus standard, or may be connected wirelessly such as wireless Local Area Network (LAN). With any interface, the adapter apparatus 100 functions to support and convert the communication protocol of the memory card 200 and that of the game console 10 in order to enable communication between the memory card 200 and the game console 10.

Also, a thin memory card 200 is shown as an external memory medium in the game system 1; however, the memory card 200 may have another shape. Flash memories are representative of a memory medium; however, another type of medium may be used.

FIG. 1 shows the game system 1 that executes a game application; however, the game system 1 may be a system that executes another type of application. According to the present embodiment, there is provided a data transmission system provided with a host apparatus that has a function of reading data from and/or writing data into the memory medium attached to the adapter apparatus 100. The game system 1 is discussed as an example of the data transmission system.

Figure 2A:
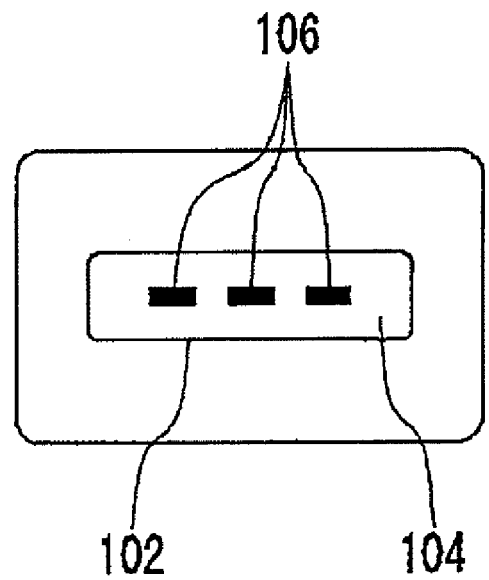
FIG. 2A shows the appearance of the front face of an adapter apparatus.

FIG. 2A shows the appearance of the front face of the adapter apparatus 100. There is provided the insertion slot 102, into which the memory card 200 is inserted, at the front face of the adapter apparatus 100. There are also provided: an opening 104 that accommodates the memory card 200; and memory card connectors 106 to be electrically coupled with terminals of the memory card 200 accommodated.

Figure 2B:
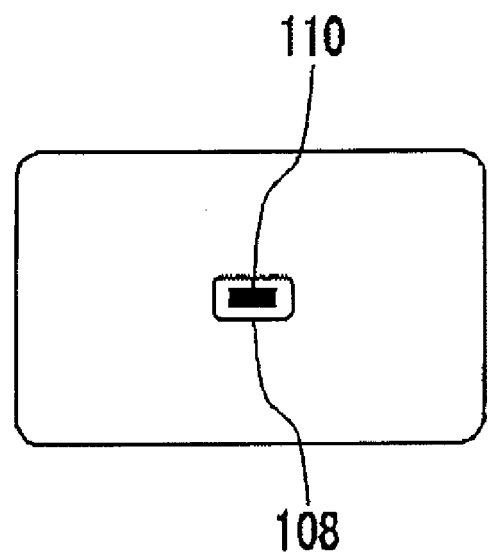
FIG. 2B shows the appearance of the back face of the adapter apparatus.

FIG. 2B shows the appearance of the back face of the adapter apparatus 100. There is provided a USB port 108, into which a terminal of the USB cable 30 is inserted, at the back face of the adapter apparatus 100. The USB port 108 is provided with a USB connector 110 to be connected to the terminal of the USB cable 30.

Figure 3:
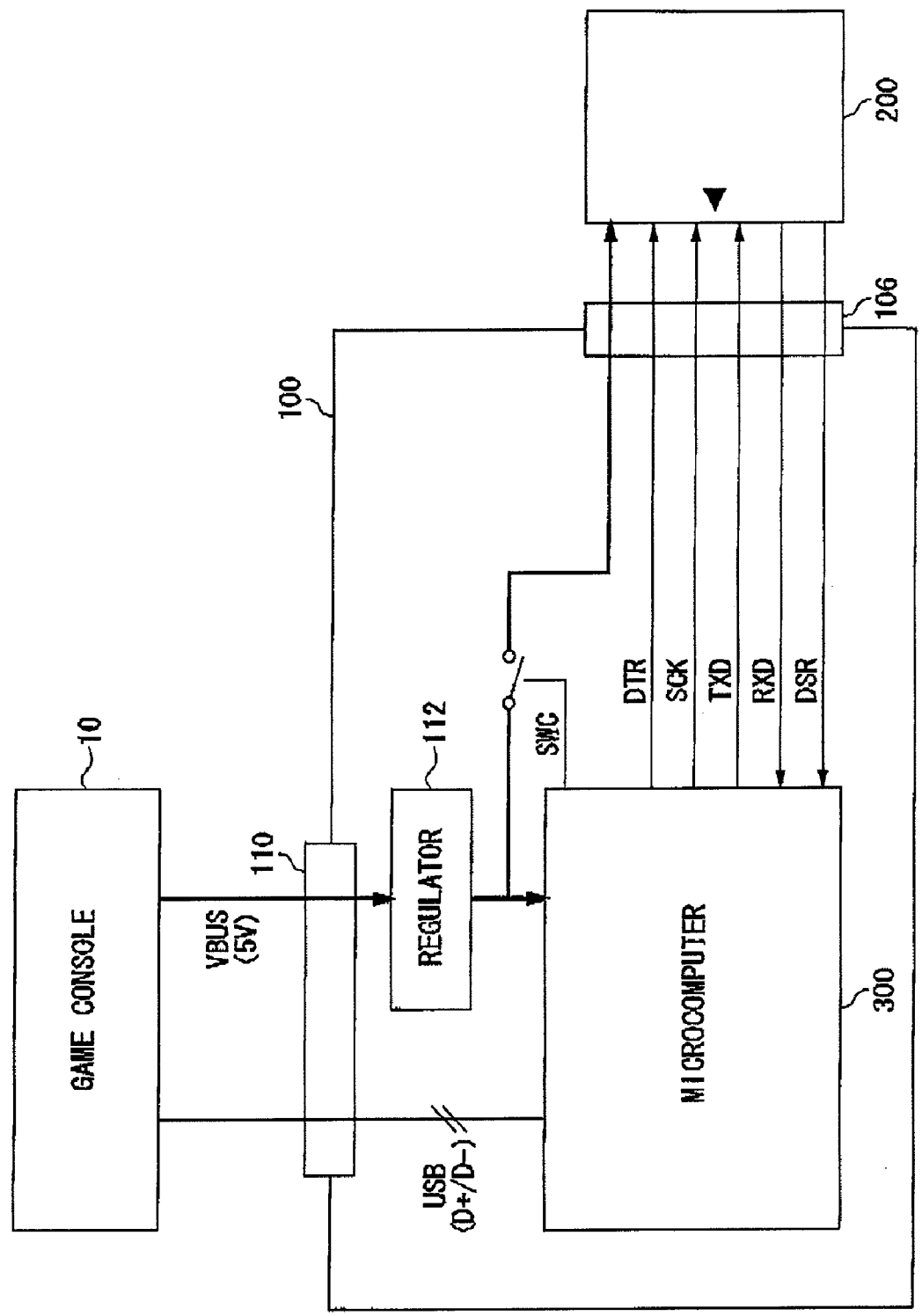
FIG. 3 shows a hardware configuration of the adapter apparatus.

FIG. 3 shows a hardware configuration of the adapter apparatus 100. The adapter apparatus 100 includes: a regulator 112 that steps down the voltage from 5 V to 3.5 V, whereas the voltage of 5 v is supplied by two power lines of VBUS and GND (not shown); and a microcomputer 300 that controls the data transfer between the memory card 200 and the game console 10. The microcomputer 300 and the memory card 200 are driven by the voltage of 3.5 V generated by the regulator 112. The SWC line is a control line for supplying power to the memory card 200, and stops the power supply to the memory card 200 so as to reduce the power consumption, when the game console 10 enters a suspended state.

The microcomputer 300 serves as a processor that includes a Central Processing Unit (CPU), and also includes: an input/output interface with each of the game console 10 and the memory card 200; and a memory. In the present embodiment, the microcomputer 300 has a function of determining the type of the memory card 200, by communicating with the memory card 200 at plural communication speeds and detecting whether or not there is a response therefrom. Data is transferred between the game console 10 and the microcomputer 300 by way of two differential signal lines (D+, D−).

The DTR line is a control line by which the microcomputer 300 requests the memory card 200 to transfer data. The SCK line is a control line that determines the data transfer timing during the data transfer period determined by a control signal from the DTR line. In synchronization with the clock supplied by the SCK line, the microcomputer 300 sends data to the memory card 200 over the TXD line and the memory card 200 sends data to the microcomputer 300 over the RXD line. The TXD line and the RXD line are signal lines for transferring data. Upon receiving a signal from the microcomputer 300, the memory card 200 returns an ACK signal representing the reception, on the DSR line.

A case is considered where there is the possibility that plural types of the memory cards 200 are attached to the adapter apparatus 100, in the game system 1 according to the present embodiment. An example of the above case is that when the version of the hardware specifications of the game console is upgraded once in several years and the game consoles of plural generations are distributed in the world, memory cards are respectively manufactured in accordance with the communication speed (baud rate) of the game console of each generation. For this reason, the type of the memory card 200 has to be detected and the communication characteristic thereof be recognized, and then the communication suitable for the communication characteristic of the memory card 200 has to be performed, in order for the adapter apparatus 100 to communicate with the memory card 200.

Figure 4:
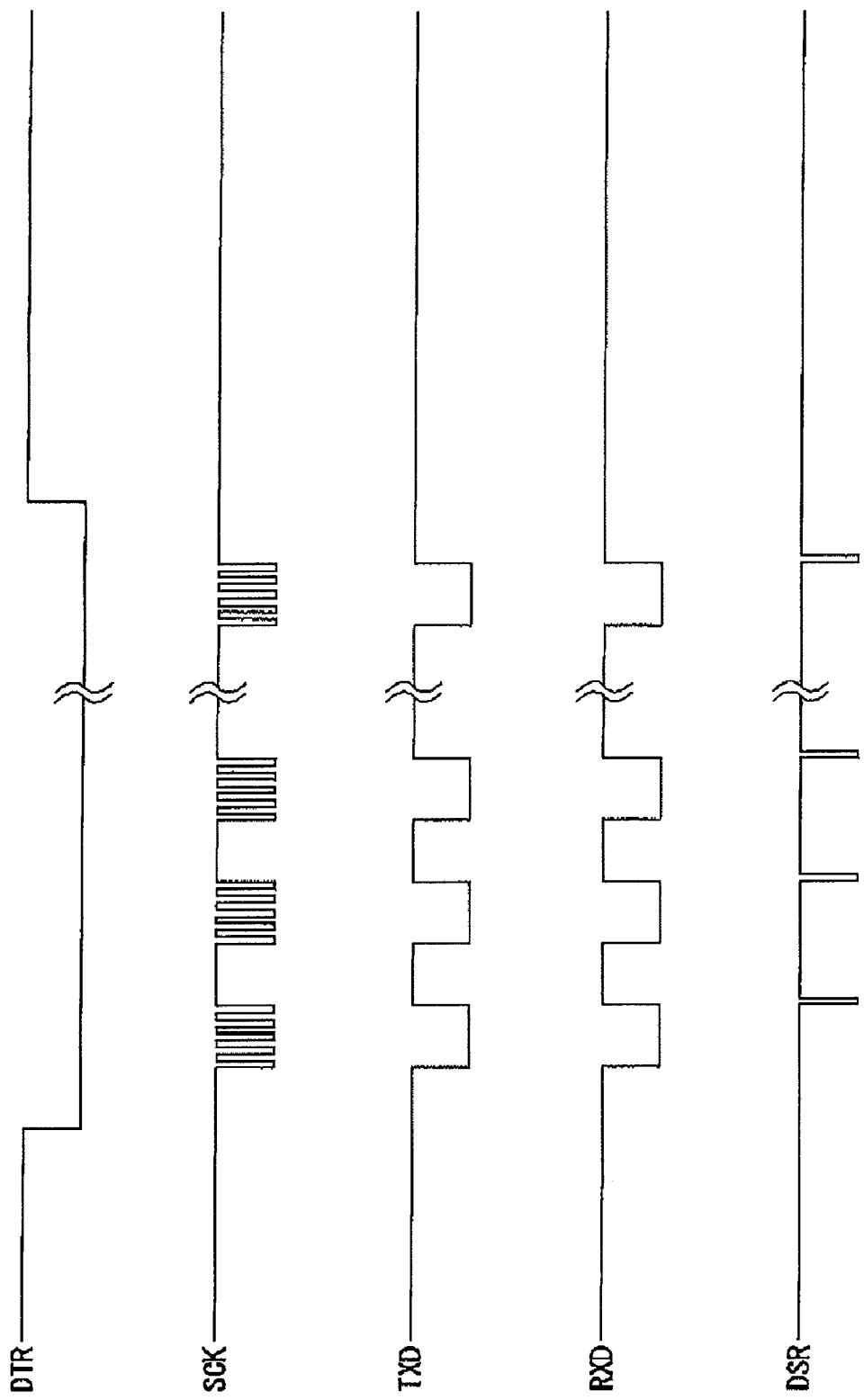
FIG. 4 is a timing chart of communication between the adapter apparatus and a memory card.

FIG. 4 is a timing chart of the communication between the adapter apparatus 100 and the memory card 200. When the control signal supplied by the DTR line turns on (from high to low), communication between the adapter apparatus 100 and the memory card 200 is enabled. The adapter apparatus 100 sends a signal to the memory card 200 over the TXD line in synchronization with the clock supplied by the SCK line. The memory card 200 sends a signal to the adapter apparatus 100 over the RXD line. Upon reception of the signal fed from the adapter apparatus 100, the memory card 200 sends back an ACK signal over the DSR line.

In order to enable the communication shown in the timing chart of FIG. 4, it is necessary for the adapter apparatus 100 to determine the type of the memory card 200 and learn the communication protocol including the communication speed, as described. Hereinafter, a description will be given of a configuration whereby the adapter apparatus 100 determines the type of the memory card 200 so as to implement an efficient data transfer process with the memory card 200.

Figure 5:
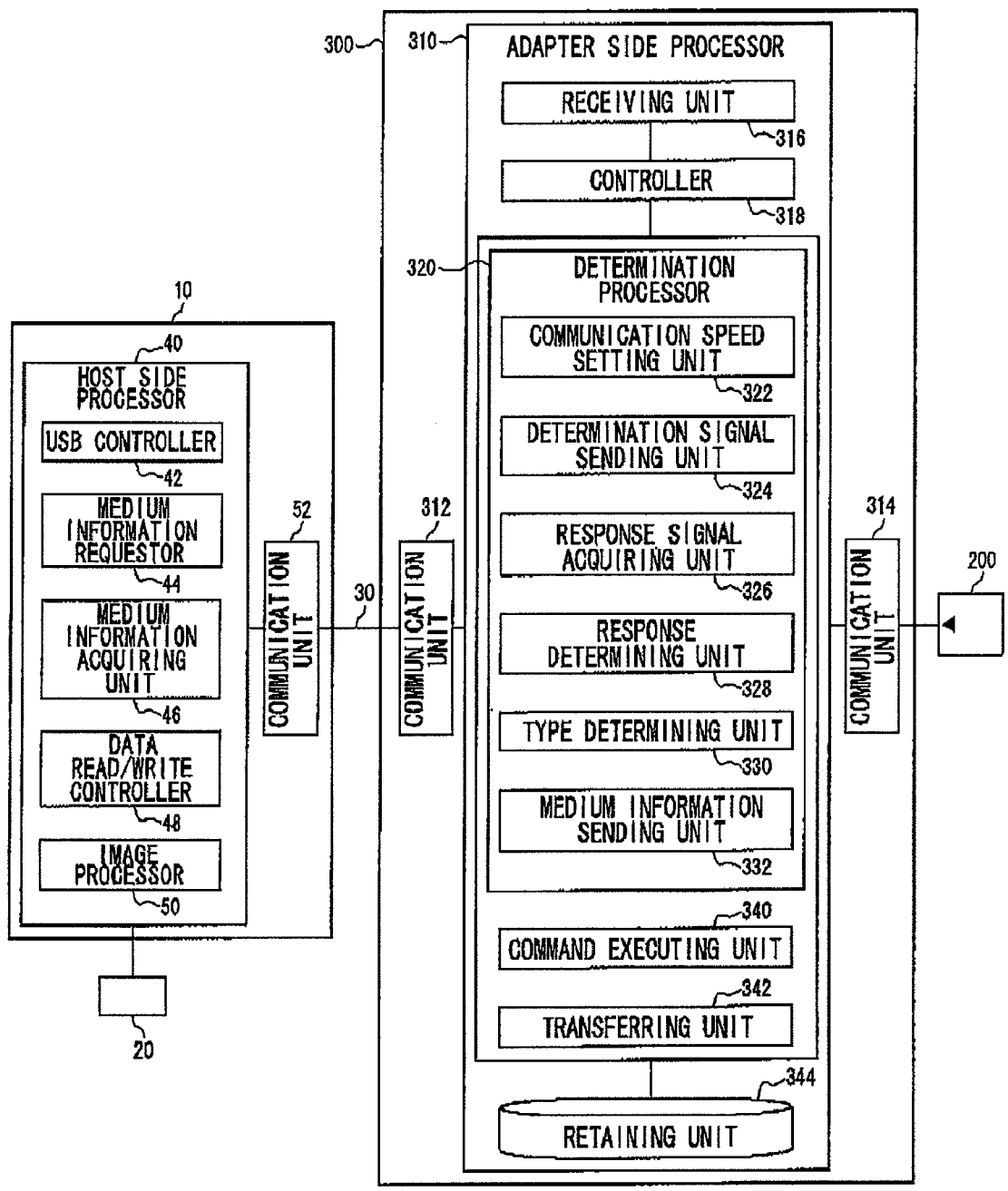
FIG. 5 shows an interior configuration of a game console and that of a microcomputer.

FIG. 5 shows an interior configuration of the game console 10 and that of the microcomputer 300. The game console 10 includes: a host side processor 40; and a communication unit 52. The host side processor 40 includes: a USB controller 42; a medium information requester 44; a medium information acquiring unit 46; a data read/write controller 48; and an image processor 50. Each of the functions of the aforementioned units is performed by a CPU, memory, or program loaded into memory. The figure shows the functional blocks achieved by cooperation thereof. The program may be installed in the game console 10. It should be understood by a person skilled in the art that each of the aforementioned functional blocks is implemented by only hardware, only software, or optional combinations thereof.

The microcomputer 300 is provided with; an adapter side processor 310; and communication units 312 and 314. The adapter side processor 310 includes: a receiving unit 316; a controller 318; a determination processor 320; a command executing unit 340; a transferring unit 342; and a retaining unit 344. The determination processor 320 includes: a communication speed setting unit 322; a determination signal sending unit 324; a response signal acquiring unit 326: a response determining unit 328; a type determining unit 330; and a medium information sending unit 332. The controller 318 exercises overall control over the process in the microcomputer 300. As described heretofore, the microcomputer 300 is composed of a CPU, memory, communication interface, etc. The figure shows the functional blocks achieved by cooperation thereof. The above functions may be performed by a program loaded into memory.

The communication unit 52 of the game console 10 is connected to the communication unit 312 of the microcomputer 300 by the USB cable 30 in accordance with the USB standard. Also, the communication unit 314 of the microcomputer 300 is connected to the memory card 200 in accordance with a given communication standard. Each of the communication units 52, 312, and 314 serves as a sending unit that sends a signal to a destination unit to be connected to, and also serves as a receiving unit that receives a signal. Hereinafter, a description stating that a component other than the communication unit sends or receives a signal (data) means actually sending or receiving the signal (data) via the communication unit.

(1) Process of Detecting the Connection Between the Game Console 10 and the Adapter Apparatus 100

When the game console 10 and the adapter apparatus 100 are connected by the USB cable 30, the USB controller 42 in the host side processor 40 performs the initialization process conforming to the USB standard.

When the USB controller 42 detects that the adapter apparatus 100 is connected, the USB controller 42 sends a descriptor information read request to the adapter apparatus 100. When the receiving unit 316 receives the descriptor information read request, the controller 318 reads the descriptor information from the retaining unit 344 and sends the descriptor information to the game console 10. The descriptor represents information including the characteristic or attribute of a node terminal in the USB standard. There are provided a device descriptor, configuration descriptor, interface descriptor, endpoint descriptor, etc. When the USB controller 42 acquires the descriptor information, it is determined that the node terminal connected is the adapter apparatus 100. This allows the game console 10 and the adapter apparatus 100 to start communication.

(2) Process of Determining the Type of the Memory Medium

When communication is enabled between the game console 10 and the adapter apparatus 100, the medium information requester 44 requests the adapter apparatus 100 to send the information on the memory medium. Immediately after communication with the adapter apparatus 100 is enabled by the USB controller 42, the medium information requester 44 sends an information send request to the adapter apparatus 100. With this, when a memory medium is attached to the adapter apparatus 100, the medium information acquiring unit 46 acquires information indicating that the memory card 200 is attached, so information (an icon) indicative of the connection of the memory medium can be displayed on, for example, the screen of the output apparatus 20. Also, when the memory medium is not attached to the adapter apparatus 100, the medium information acquiring unit 46 acquires information indicating that the memory card 200 is not attached to the adapter apparatus 100, so such icon is not displayed on the screen of the output apparatus 20. In this manner, immediately after communication between the game console 10 and the adapter apparatus 100 starts, the medium information acquiring unit 46 is capable of acquiring the information indicating whether or not the memory medium is attached. Thus, the information representing that there is a memory medium attached can be displayed on the screen of the output apparatus 20 promptly.

When power is supplied from the game console 10, the controller 318 causes the determination processor 320 to start the process of determining the type of the memory medium. In the process of determining the type of the memory medium, the determination processor 320 communicates with the memory card 200 at least one communication speed and detects whether or not there is a response therefrom. When there is a response, the type of the memory card 200 attached is determined. When there is no response during the communication at plural communication speeds, it is determined that the memory card 200 is not attached. This determination process is performed repeatedly in a given cycle since the time when the power is supplied, and a result of the determination process is retained in the retaining unit 344.

When the receiving unit 316 receives the information send request, the controller 318 causes the determination processor 320 to send to the game console 10, a result of the determination process yielded by the determination processor 320 at the time of receiving the information send request. The result of the determination process to be sent may be a result retained in the retaining unit 344 immediately before the information send request is received, or may be a result of the determination process immediately after the information send request is received. After sending to the game console 10 the result of determination yielded at the time of receiving the information send request, only when detecting a change in an attachment state of the memory card 200, the determination processor 320 sends a result of detecting the change to the game console 10. The change in the attachment state means, for example, a case where the memory card 200 that has been attached is detached or a case where the memory card 200 is attached.

One cycle of the memory medium type determination process will now be described in detail. In this process, the implementation cycle of the type determination process takes, for example, approximately 100 milliseconds. It takes, for example, several milliseconds to several tens of milliseconds approximately to determine the type of the memory card 200.

Firstly, the communication speed setting unit 322 sets the communication speed for communication with the memory card 200. The communication speed setting unit 322 has a function of setting a first communication speed and a second communication speed as communication speeds. It will be assumed that the first communication speed is faster than the second communication speed. The communication unit 314 communicates with the memory card 200 at a communication speed set by the communication speed setting unit 322. When the determination signal sending unit 324 sends a preset type determination signal to the communication unit 314, the communication unit 314 sends the type determination signal to the memory card 200 at the communication speed set.

Referring back to FIG. 4, upon receiving the signal transmitted over the TXD line, the memory card 200 returns an ACK signal to the adapter apparatus 100 over the DSR line. The response signal acquiring unit 326 has a function of acquiring the response (ACK) signal from the memory card 200. It is obvious that, unless the memory card 200 is operative to receive the signal transmitted over the TXD line, naturally, the response signal cannot be sent back. In a case where the memory card 200 has the specification whereby high-speed communication is available, it might be possible to make a response to the type determination signal transmitted at low speed. In a case where the memory card 200 has the specification whereby only low-speed communication is available, it is impossible to make a response to the type determination signal transmitted at high speed. The determination processor 320 makes use of this communication characteristic to determine the medium type of the memory card 200 with a simple configuration.

The response determining unit 328 determines whether or not the response signal acquiring unit 326 has acquired the response signal. The type determining unit 330 determines the type of the memory card 200 based on the result of determination yielded by the response determining unit 328. Specifically, the type determining unit 330 determines the type of the memory card 200 based on the communication speed set by the communication speed setting unit 322 and whether or not there is a response to the type determination signal transmitted at such communication speed.

Figure 6:
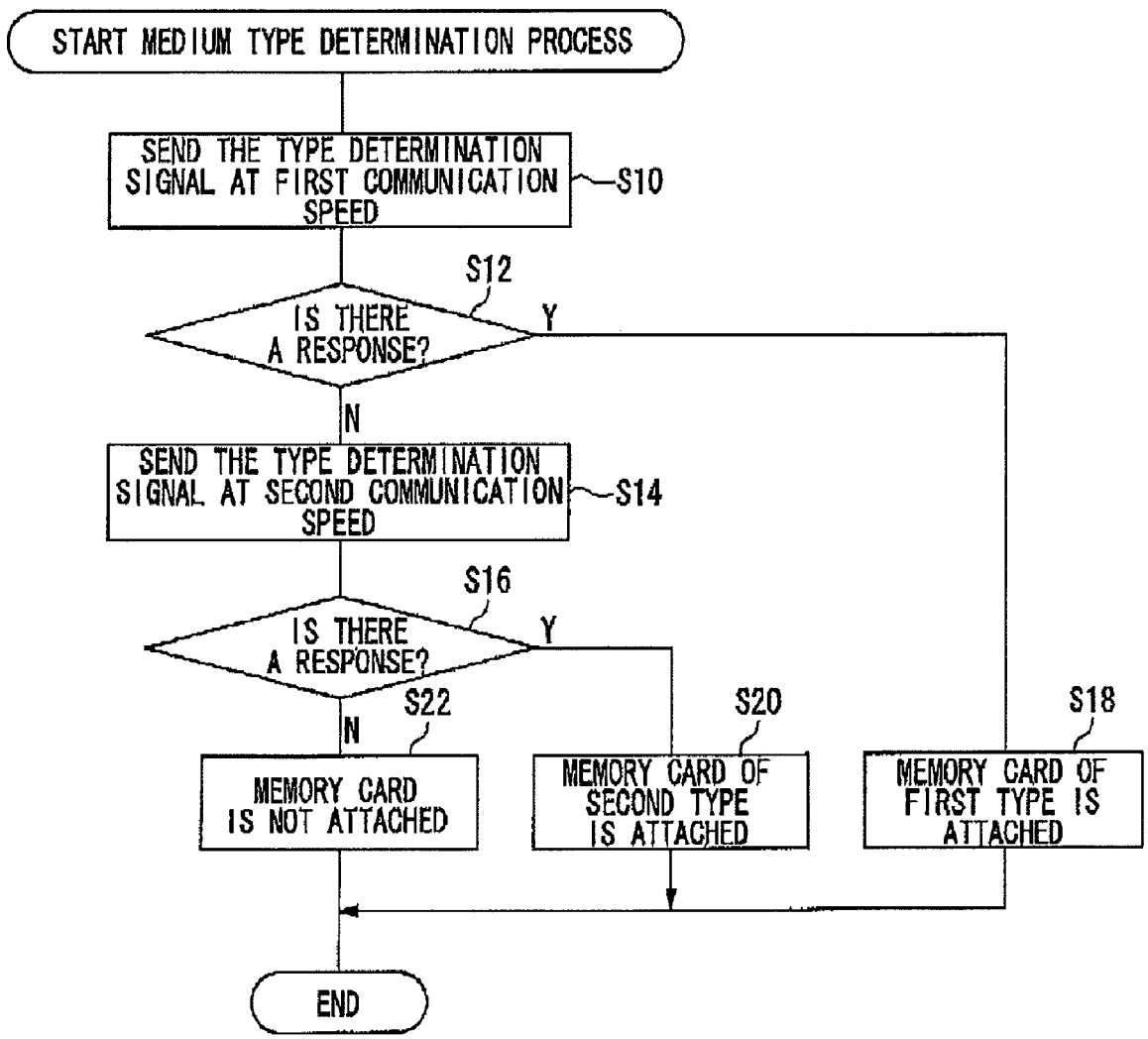
FIG. 6 is a flowchart showing a process of determining the medium type.

FIG. 6 is a flowchart showing the medium type determination process. Firstly, the communication speed setting unit 322 sets the communication speed at the first communication speed, and the communication unit 314 sends the type determination signal at the first communication speed (S10). The response determining unit 328 monitors whether or not the response signal is acquired by the response signal acquiring unit 326 (S12). When there is a response (Y in S12), the type determining unit 330 determines that the type of the memory card 200 is a first type (S18). The first type of the memory card 200 is a memory card that enables high-speed communication. When the type determining unit 330 determines that the type of the memory card 200 is of the first type, the communication speed setting unit 322 maintains the communication speed for communication with the memory card 200 at the first communication speed and causes the communication unit 314 to perform the communication process accordingly from then on.

When there is no response (N in S12), the communication speed setting unit 322 changes the communication speed from the first communication speed to the second communication speed, and the communication unit 314 sends the type determination signal at the second communication speed (S14). The response determining unit 328 monitors whether or not the response signal is acquired by the response signal acquiring unit 326 (S16). When there is a response (Y in S16), the type determining unit 330 determines that the memory card 200 is of a second type (S20). The second type of the memory card 200 enables only low-speed communication. When the type determining unit 330 determines that the memory card 200 is of the second type, the communication speed setting unit 322 maintains the communication speed with the memory card 200 at the second communication speed and causes the communication unit 314 to perform the communication process accordingly from then on. Conversely, when there is no response (N in S16), the type determining unit 330 determines that the memory card 200 is not connected to the memory card connectors 106 (S22). In this manner, when the response determining unit 328 determines that there is no response to the type determination signal transmitted at all the communication speeds set by the communication speed setting unit 322, the type determining unit 330 determines that the memory card 200 is not attached.

The time required for the medium type determination process can be shortened by sending the type determination signal at the first communication speed, faster than the second communication speed, in the first place (S10). For example, if the type determination signal is sent at the second communication speed in the first place, it is likely that both the memory card of the first type and that of the second type respond to the type determination signal. The medium type determination process at the second communication speed determines that the memory card 200 is attached; however, it is impossible to determine which type of the memory card 200 is attached. Therefore, performing the medium type determination at the first speed in the first place provides an advantage in that, when the memory card attached is of the first type, the type can be immediately determined and the medium type determination process at the second communication speed can be eliminated.

The above medium type determination process is implemented in a given cycle of, for example, 100 milliseconds by the controller 318. The medium information sending unit 332 sends the result of determining the type of the memory card 200 yielded by the type determining unit 330 to the game console 10. After sending the result of determination yielded by the type determining unit 330 at the time of receiving the information send request from the game console 10, the medium information sending unit 332 sends a result of determination yielded by the type determining unit 330 to the game console 10, only when there is a change in the attachment state of the memory card 200. This reduces the amount of data transferred between the game, console 10 and the adapter apparatus 100. The information sent from the medium information sending unit 332 is acquired by the medium information acquiring unit 46. The medium information acquiring unit 46 posts the type of the memory card 200 attached to the image processor 50, and the image processor 50 displays the icon representing which type of the memory card 200 is attached.

After sending the information send request once, the medium information requestor 44 needs not to send the information send request to the same adapter apparatus 100. This allows the host side processor 40 to acquire the medium information only when there is a change in the attachment state of the memory card 200, thereby eliminating the unnecessary transfer of signal to the microcomputer 300 and reducing the processing load.

While communication between the memory card 200 and the game console 10 is proceeding, the controller 318 does not perform the medium type determination process. The controller 318 monitors the communication state between the memory card 200 and the game console 10. In the absence of communication for, for example, 100 milliseconds continuously, the controller 318 determines that communication is not conducted, and then performs the medium type determination process. Conversely, when the non-communication period is less than 100 milliseconds, communication between the memory card 200 and the adapter apparatus 100 is maintained at the communication speed set by the communication speed setting unit 322. Herein, the state in which the memory card 200 is communicating with the adapter apparatus 100 means, for example, the state where data of the memory card 200 is transferred to the adapter apparatus 100. Hereinafter, a process of reading data from the memory card 200 will be described.

(3) Process of Reading Data from the Memory Card 200

The data read/write controller 48 controls reading data into and/or writing data from the memory card 200. Data is transferred on a given data unit basis (block) known as page, and plural commands have to be prepared to read out a page.

FIG. 7A shows an example of a Block_Read command set, which is necessary for reading out a page. The Read_Start command is a command for designating the address of the memory card 200. A Page_Read command is a command for reading out data from the designated address. The Read_End command is a command designating the termination of the page read process. In this example, seven commands are needed for the page read process.

When seven commands are sent via the USB cable 30 as shown in FIG. 7A so that the data read/write controller 48 reads a page from the memory card 200, there is a problem that it takes time to transfer the commands. To address the issue, the game system 1 is configured such that the retaining unit 344 retains a Block_Read command set in advances and when the data read/write controller 48 sends one Block_Read command to the adapter apparatus 100, the adapter apparatus 100 is capable of carrying out the page read process.

FIG. 7B is a correspondence table of commands retained in the retaining unit 344. In the correspondence table, the Block_ Read command is associated with the Read_Start command, five Page_Read commands, and the Read_End command in this order.

The data read/write controller 48 uses the Block_Read command to read a page from the memory card 200. When the receiving unit 316 receives the Block_Read command, the command executing unit 340 refers to the correspondence table shown in FIG. 7B and reads out seven commands associated with the Block_Read command. The command executing unit 340 sequentially sends each of the commands to the memory card 200 in accordance with the sequence that the commands were read out to perform the page read process. Data read from the memory card 200 is transferred to the data read/write controller 48 by the transferring unit 342. The above page read process allows the adapter apparatus 100 to execute plural commands by merely sending one Block_ Read command from the game console 10 to the adapter apparatus 100. This eliminates the need for sending a command set from the game console 10 to the adapter apparatus 100, permitting the data transfer time to be shortened. The provision is not limited to the Block_Read command, and may be used for another kind of command.

The description of the invention given above is based upon an embodiment. The embodiment is illustrative in nature and various variations in constituting elements and processes involved are possible. Those skilled in the art would readily appreciate that such variations are also within the scope of the present invention.

In the above embodiment, a description is given of two types of memory media; however, there may be three or more. In addition, a description is given of a case where the plural types of memory media are derived from the plural versions of a given game console 10. The plural types may be derived from different types of memory media used in different information processing apparatuses. Further, a description is given of data reading from the memory card 200; however, the inventive approach is equally applicable to data writing.

What is claimed is:

1. An adapter apparatus comprising:
a first connector to be electrically coupled to a terminal of an external memory medium;
a second connector to be electrically coupled to a host apparatus; and
a processor which controls data transfer between the external memory medium and the host apparatus, the processor comprising
a determination processor which determines a type of the external memory medium by communicating with the external memory medium using at least one communication speed and determining whether or not there has been a response; and
a controller which causes the determination processor to perform the determination process,
wherein the determination processor comprises:
a communication speed setting unit which sets a communication speed for communication with the external memory medium;
a sending unit which sends a preset signal to the external memory medium at the set communication speed;
a response determining unit which determines whether or not there has been a response to the preset signal;
a type determining unit which determines the type of the external memory medium or whether or not the external memory medium is attached in accordance with a result of determination yielded by the response determining unit,
wherein the controller monitors a communication state between the external memory medium and the host apparatus, and causes the determination processor not to perform the determination process while communication is processing between the external memory medium and the host apparatus, and the controller causes the determination processor to perform the determination process repeatedly in a cycle in the absence of communication between the external memory medium and the host apparatus; and
a receiving unit which receives an information send request from the host apparatus, the information regarding the external memory medium, wherein when the type determining unit detects a change in an attachment state of the external memory medium after the processor sends a result of determining the type of the external memory medium yielded at the time of receiving the information send request from the host apparatus, the processor sends a result of detecting the change to the host apparatus.

2. An adapter apparatus comprising:
a connector to be electrically coupled to a terminal of an external memory medium;
a communication unit which communicates with a host apparatus;
a processor which controls data transfer between the external memory medium and the host apparatus, the processor comprising
a determination processor which determines a type of the external memory medium by communicating with the external memory medium using at least one communication speed and determining whether or not there has been a response; and
a controller which causes the determination processor to perform the determination process,
wherein the determination processor comprises:
a communication speed setting unit which sets a communication speed for communication with the external memory medium;
a sending unit which sends a preset signal to the external memory medium at the set communication speed;
a response determining unit which determines whether or not there has been a response to the preset signal;
a type determining unit which determines the type of the external memory medium or whether or not the external memory medium is attached in accordance with a result of determination yielded by the response determining unit,
wherein the controller monitors a communication state between the external memory medium and the host apparatus, and causes the determination processor not to perform the determination process while communication is processing between the external memory medium and the host apparatus, and the controller causes the determination processor to perform the determination process repeatedly in a cycle in the absence of communication between the external memory medium and the host apparatus; and
a receiving unit which receives an information send request from the host apparatus, the information regarding the external memory medium,
wherein when the type determining unit detects a change in an attachment state of the external memory medium after the processor sends a result of determining the type of the external memory medium yielded at the time of receiving the information send request from the host apparatus, the processor sends a result of detecting the change to the host apparatus.

3. The adapter apparatus according to claim 1,
wherein the communication speed setting unit determines the speed of communication between the adapter apparatus and the external memory medium in accordance with the type of the external memory medium determined by the type determining unit, and
when a period of the absence of communication between the external memory medium and the host apparatus is less than the predetermined period, the controller causes a data read process for reading data from the external memory medium to continue at the communication speed set by the communication speed setting unit.

4. The adapter apparatus according to claim 2,
wherein the communication speed setting unit determines the speed of communication between the adapter apparatus and the external memory medium in accordance with the type of the external memory medium determined by the type determining unit, and
when a period of the absence of communication between the external memory medium and the host apparatus is less than the predetermined period, the controller causes a data read process for reading data from the external memory medium to continue at the communication speed set by the communication speed setting unit.

5. The adapter apparatus according to claim 1, wherein the communication speed setting unit sets a first communication speed and a second communication speed as communication speeds; and
when the response determining unit determines that there is no response to the preset signal sent at the first communication speed, the communication speed setting unit changes the communication speed to the second communication speed.

6. The adapter apparatus according to claim 2, wherein the communication speed setting unit sets a first communication speed and a second communication speed as communication speeds; and
when the response determining unit determines that there is no response to the preset signal sent at the first communication speed, the communication speed setting unit changes the communication speed to the second communication speed.

7. The adapter apparatus according to claim 1, wherein when the response determining unit determines that there is no response to the preset signals sent at all the communication speeds set by the communication speed setting unit, the type determining unit determines that no external memory medium is attached to the adapter apparatus.

8. The adapter apparatus according to claim 2, wherein when the response determining unit determines that there is no response to the preset signals sent at all the communication speeds set by the communication speed setting unit, the type determining unit determines that no external memory medium is attached to the adapter apparatus.

9. The adapter apparatus according to claim 1, further comprising:
a retaining unit which retains a plurality of commands associated with a preset instruction received at the receiving unit from the host apparatus; and
a command executing unit which sequentially sends the a plurality of commands retained in the retaining unit to the external memory medium.

10. The adapter apparatus according to claim 2, further comprising:
a retaining unit which retains a plurality of commands associated with the preset instruction received at the receiving unit from the host apparatus; and
a command executing unit which sequentially sends the a plurality of commands retained in the retaining unit to the external memory medium.

11. A data transfer system comprising:
a host apparatus which is operative to read data from and/or write data into an external memory medium attached to an adapter apparatus,
wherein the host apparatus comprises a medium information requestor which requests the adapter apparatus to send information on the external memory medium, when it is determined that an external terminal connected is the adapter apparatus;

wherein the adapter apparatus comprises
- a receiving unit which receives an information send request from the host apparatus;
- a determination processor which performs a determination process of communicating with the external memory medium using at least one communication speed so as to determine whether or not there has been a response, determining a type of the attached external memory medium when there is a response, and determining that no external memory medium is attached when there is no response as a result of communicating with the external memory medium using a plurality of communication speeds; and
- a controller which causes the determination processor to perform the determination process, wherein, when the receiving unit receives the information send request, the determination processor sends a result of determination process to the host apparatus; and wherein the controller monitors a communication state between the external memory medium and the host apparatus, and causes the determination processor not to perform the determination process while communication is processing between the external memory medium and the host apparatus, and the controller causes the determination processor to perform the determination process repeatedly in a cycle in the absence of communication between the external memory medium and the host apparatus; and wherein when the determination processor detects a change in an attachment state of the external memory medium after the determination processor sends to the host apparatus the result of the determination process yielded at the time of receiving the information send request, the determination processor sends a result of detecting the change to the host apparatus.

12. The data transfer system according to claim 11,
wherein the host apparatus comprises a read controller which gives a data read instruction to read data from the external memory medium; and wherein the adapter apparatus comprises
- a retaining unit which retains a plurality of commands associated with the data read instruction which is received by the receiving unit; and
- a command executing unit which sequentially sends a plurality of commands retained in the retaining unit to the external memory medium.

* * * * *